US012779859B2

(12) United States Patent
Osakabe et al.

(10) Patent No.: US 12,779,859 B2
(45) Date of Patent: Nov. 3, 2026

(54) INK TANK AND INKJET PRINTER

(71) Applicant: Brother Kogyo Kabushiki Kaisha, Nagoya (JP)

(72) Inventors: Yoshinori Osakabe, Seto (JP); Tomohisa Higuchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 2 days.

(21) Appl. No.: 16/582,481

(22) Filed: Sep. 25, 2019

(65) Prior Publication Data

US 2020/0101748 A1 Apr. 2, 2020

(30) Foreign Application Priority Data

Sep. 28, 2018 (CN) ......................... 201821595723.0
Sep. 28, 2018 (CN) ......................... 201821595724.5

(51) Int. Cl.
*B41J 2/175* (2006.01)

(52) U.S. Cl.
CPC ................................ *B41J 2/17513* (2013.01)

(58) Field of Classification Search
None
See application file for complete search history.

(56) References Cited

U.S. PATENT DOCUMENTS

| | | | | |
|---|---|---|---|---|
| 5,903,294 A * | 5/1999 | Abe | B41J 2/17553 | 347/85 |
| 8,789,917 B2 * | 7/2014 | Kubo | B41J 2/16526 | 347/30 |
| 9,815,295 B2 * | 11/2017 | Kudo | B41J 2/17553 | |
| 2002/0105564 A1 * | 8/2002 | Matsumoto | B41J 2/17513 | 347/85 |
| 2006/0023038 A1 * | 2/2006 | Seu | B41J 2/175 | 347/85 |
| 2012/0038719 A1 * | 2/2012 | Shimizu | B41J 2/17513 | 347/86 |
| 2015/0109386 A1 * | 4/2015 | Koike | B41J 2/17513 | 347/86 |
| 2016/0009100 A1 * | 1/2016 | Kudo | B41J 2/17553 | 347/92 |
| 2016/0016409 A1 * | 1/2016 | Kimura | B41J 2/17513 | 347/86 |
| 2017/0305163 A1 * | 10/2017 | Kimura | B41J 29/13 | |
| 2019/0009569 A1 * | 1/2019 | Kudo | B41J 2/17509 | |

FOREIGN PATENT DOCUMENTS

| | | |
|---|---|---|
| JP | 2017-081059 A | 5/2017 |
| JP | 2017-081061 A | 5/2017 |

* cited by examiner

*Primary Examiner* — Alejandro Valencia
(74) *Attorney, Agent, or Firm* — Kenealy Vaidya LLP

(57) ABSTRACT

An ink tank for an inkjet printer includes an ink chamber, a buffer chamber, and an air communication portion. The ink chamber contains ink, and the buffer chamber communicates with the ink chamber. The air communication portion includes a flow path, a connecting portion, and an air communication tube. The flow path communicates with the buffer chamber, and at least a portion of the flow path is disposed on a side wall of the ink chamber and extends over the side wall. The connecting portion is disposed at a top portion of the flow path. The air communication tube is connected to the connecting portion and is in fluid communication with the flow path through the connecting portion.

14 Claims, 9 Drawing Sheets

320

INK TANK AND INKJET PRINTER

CROSS-REFERENCE TO RELATED APPLICATION

This application claims priority from Chinese Utility Model Applications No. 201821595723.0, filed on Sep. 28, 2018, and No. 201821595724.5, filed on Sep. 28, 2018, the contents of which are incorporated herein by reference in their entirety.

TECHNICAL FIELD

Aspects disclosed herein relates to an ink tank and an inkjet printer including the ink tank.

BACKGROUND

An inkjet printer 1 performs printing by ejecting ink from a recording portion 12 to a recording medium (for example, printing paper).

FIG. 1 schematically shows an example of a known inkjet printer 1. Hereinafter, for convenience of description, a direction in which the inkjet printer faces the user is defined as "front" based on the position where the user uses the inkjet printer, and an opposite direction is defined as "rear", and a left-hand side of the user is defined as "left" and a right-hand side of the user is "right".

As illustrated in FIG. 1, the inkjet printer 1 includes a printer body 19 and four ink tanks 20 disposed on one side (for example, a front side) of the printer body 19. The printer body 19 includes a frame portion 11, and the four ink tanks 20 are disposed in the frame portion 11. One of the four ink tanks 20 is disposed at the front left side of the frame portion 11, and the remaining three ink tanks 20 are disposed side by side at the front right side of the frame portion 11.

FIG. 2 schematically shows an example of an ink tank 20. As illustrated in FIG. 2, the ink tank 20 includes an ink chamber 23, an ink inlet portion 21, an ink outlet portion 24, an air communication portion 28, and a buffer chamber 27. The ink chamber 23 is configured to accommodate ink to be supplied to the recording portion 12. The ink inlet portion 21 is disposed on a top portion of the ink chamber 23 and extends upward. The ink inlet portion 21 has an ink inlet port 22 communicating with an inner space of the ink chamber 23 at the top portion to allow the user to pour ink into the ink chamber 23 therethrough. In a non-inletting state, the ink inlet port 22 is sealed by a cap 25, and in an inletting state, the cap 25 is removed to expose the ink inlet port 22 to inlet ink. The ink outlet portion 24 is positioned above the ink chamber 23. The ink outlet portion 24 communicates with the recording portion 12 through an ink outlet tube (not shown) to supply ink to the recording portion 12. The buffer chamber 27 is positioned below the ink chamber 23 and communicates with the ink chamber 23 through a flow path (not shown). The air communication portion 28 includes a connecting portion 38 and an air communication tube 70. The connecting portion 38 is provided at the top portion of the buffer chamber 27 and has a passage therein that communicates with the buffer chamber 27. The air communication tube 70 is connected to the connecting portion 38. Thus, the buffer chamber 27 may be in communication with the outside atmosphere through the connecting portion 38 and the air communication tube 70.

The working principle of the ink tank 20 is as follows.

When inletting ink into the ink tank 20, the ink outlet tube and the air communication tube 70 are first closed using a switching member such as a valve, and then the cap 25 sealing the ink inlet port 22 is removed from the ink inlet port 22. At this time, an inner space of the ink tank 20 (i.e., the ink chamber 23 and the buffer chamber 27) may communicate with the outside only through the ink inlet port 22. Then, a distal end portion of an ink bottle (not shown) is inserted into the ink inlet portion 21, and the ink flows from the ink bottle into the inner space of the ink tank 20 through the ink inlet port 22. A part of the ink flows into the buffer chamber 27, and compresses air in buffer chamber 27 and air in the air communication tube 70 between the switching member and the buffer chamber 27. When the ink inletting is completed, the pressure of the compressed air in the buffer chamber 27 is equal to the sum of the pressure of the ink stored in the ink tank 20 and the atmospheric pressure. Normally, when the ink inletting is completed, only a small amount of ink is contained in the buffer chamber 27.

After the ink inletting is completed, the ink inlet port 22 of the ink tank 20 is sealed using the cap 25, and then the switching member is opened to bring the ink outlet tube and the air communication tube 70 back into communication. The buffer chamber 27 may communicate with the atmosphere via an air communication portion 28, and thus the air pressure in the buffer chamber 27 may be lowered to be the atmospheric pressure. At this time, the pressure of gas in the ink chamber 23 between an ink level and the cap 25 may be also the atmospheric pressure. Therefore, under the action of gravity, a part of the ink stored in the ink chamber 23 may enter into the buffer chamber 27. At the same time, the ink level in the ink chamber 23 may be lowered and a space above the ink level may be increased, so that the air pressure above the ink level in the ink chamber 23 may be lowered and the pressure of the ink in the ink tank 20 may be also lowered. When the sum of the ink pressure, which the ink in the ink chamber 23 affects the flow path that communicates the ink chamber 23 with the buffer chamber 27, and the air pressure above the ink level in the ink chamber 23 is equal to the sum of the ink pressure, which the ink in the buffer chamber 27 affects the flow path, and the atmospheric pressure, the liquid level of the ink in the ink chamber 23 and the liquid level the ink in the buffer chamber 27 may be kept stable. Normally, the liquid level of the ink in the ink chamber 23 may be slightly lowered, and accordingly, the liquid level of the ink in the buffer chamber 27 may be slightly increased.

During the operation of the inkjet printer 1, the ink stored in the ink tank 20 (specifically, the ink chamber 23) is supplied to the recording portion 12 via the ink outlet portion 24, and the ink in the ink chamber 23 is consumed to cause the ink level in the ink chamber 23 to decrease. At this time, the ink pressure which the ink in the ink chamber 23 affects the flow path that communicates the ink chamber 23 with the buffer chamber 27 may be lowered, and the pressure on both sides of the flow path may be unbalanced. The pressure on the side of the buffer chamber 27 is greater than the pressure on the side of the ink chamber 23. Therefore, under the action of the pressure, the ink stored in the buffer chamber 27 is partially returned to the ink chamber 23, and a part of the gas enters into the ink chamber 23 via the buffer chamber 27 to keep the pressure balanced.

For the ink tank 20 shown in FIG. 2, if a portion, between the switching member and the connecting portion 38, of the air communication tube 70 is damaged to cause the buffer chamber 27 to be in communication with the outside atmosphere through the damaged portion, during the ink inletting process or when the cap 25 cannot seal the ink inlet port 22, a sealed space may not be formed in the buffer chamber 27.

The ink in the ink chamber 23 continuously may flow into the buffer chamber 27. If the amount of the ink is excessive and, for example, the user continuously inlets ink without paying attention to the damage during the ink inletting process, the ink may continue to flow into the connecting portion 38 and the air communication tube 70 after filling the buffer chamber 27, and flow out through the damaged portion. At this time, the outer surface of the ink tank 20 and the inner space of the frame portion 11 may be contaminated.

SUMMARY

According to the one or more aspects of the disclosure, an ink tank may include an ink chamber, a buffer chamber, and an air communication portion. The ink tank may be used for an inkjet printer, and the inkjet printer may include a printer body. The ink chamber may be configured to contain ink to be supplied to the printer body. The buffer chamber may communicate with the ink chamber. The air communication portion may include a flow path, a connecting portion, and an air communication tube. The flow path may communicate with the buffer chamber, and at least a portion of the flow path may be disposed on a side wall of the ink chamber and extend over the side wall. The connecting portion may be disposed at a top portion of the flow path. The air communication tube may be connected to the connecting portion and may be in fluid communication with the flow path through the connecting portion.

According to the one or more other aspects of the disclosure, an ink tank may include an ink chamber, an ink inlet portion, a buffer chamber, and an air communication portion. The ink tank may be used for an inkjet printer, and the inkjet printer may include a printer body. The ink chamber may be configured to contain ink to be supplied to the printer body. The ink inlet portion may have an ink inlet port communicating with the ink chamber to inlet ink. The buffer chamber may communicate with the ink chamber. The air communication portion may include a connecting portion, and an air communication tube. The connecting portion may protrude upward from a top end of the buffer chamber and communicate with the buffer chamber. The top end of the connecting portion may not be higher than a maximum capacity line of the ink chamber. The air communication tube may be connected to the connecting portion and may be in fluid communication with the buffer chamber through the connecting portion. The top end of the buffer chamber may include a barrier wall protruding upward and surrounding the connecting portion.

According to the one or more other aspects of the disclosure, an inkjet printer may include an ink tank and a recording portion. The recording portion may be configured to record an image on a sheet with the ink supplied from the ink tank.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings. The terms “front”, “rear”, “left”, “right”, “top” and “bottom” are used herein for the purpose of illustration and not of limitation. The terms “first” and “second” referenced herein are merely identification and do not have any other meaning, such as a particular order. For example, the term “first component” does not imply the presence of “second component”, and the term “second component” does not imply the presence of “first component”.

The ink tank according to the disclosure will be described in detail below with reference to the accompanying drawings. The ink tank is used for the inkjet printer 1 shown in FIG. 1. The inkjet printer may have various functions such as an image scanner function, a facsimile function and a copier function, in addition to a printing function. The printing function may include a double-sided image recording function capable of recording an image on both sides of a single sheet. It is also arbitrary as to whether or not there is a function other than the printing function.

First Embodiment

Figure 3:
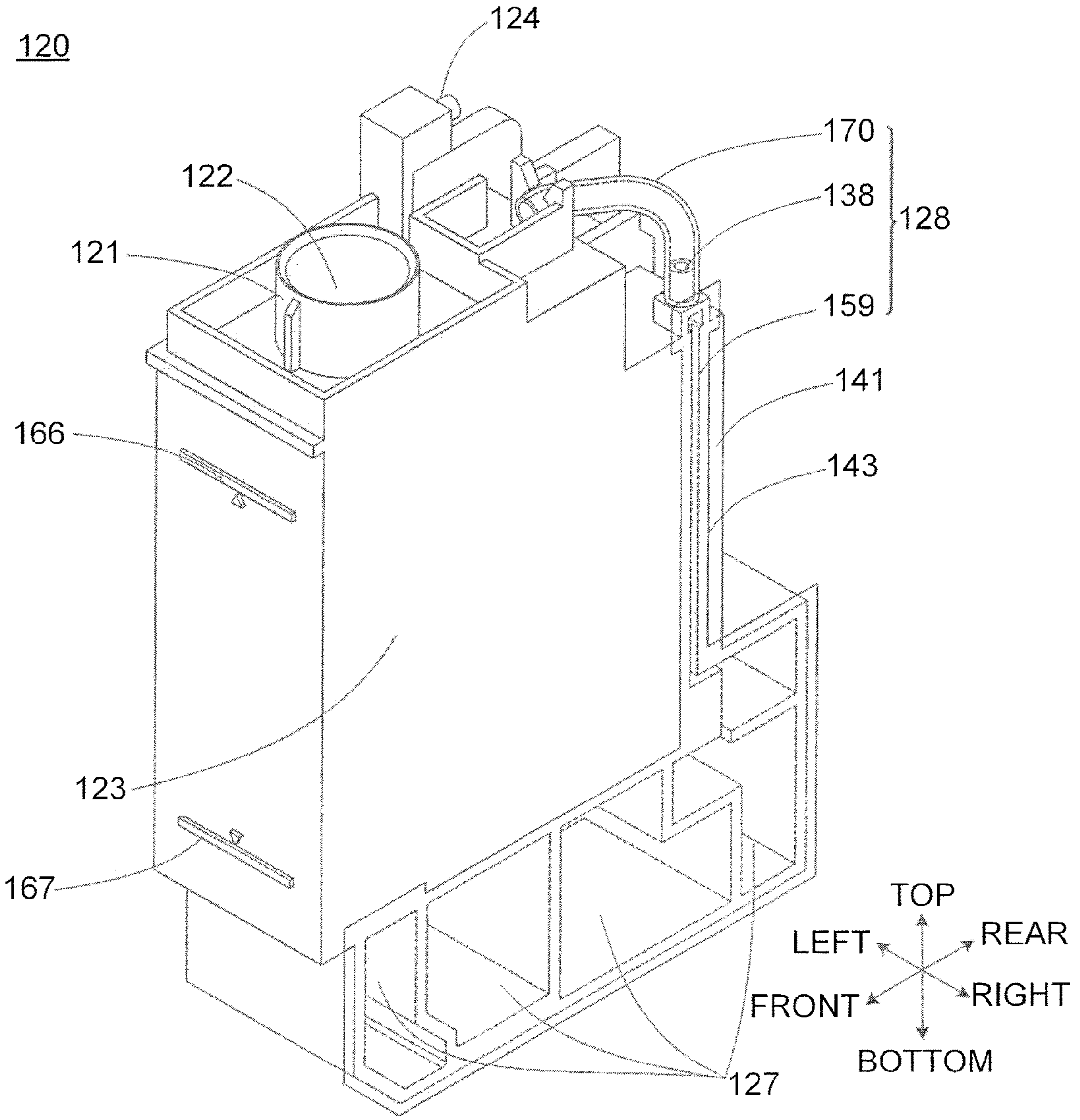
FIG. 3 is a perspective view of an ink tank according to a first embodiment of the disclosure.

FIG. 3 shows an ink tank 120 according to a first embodiment of the disclosure. The ink tank 120 includes an ink chamber 123, an ink inlet portion 121, an ink outlet portion 124, an air communication portion 128, and a buffer chamber 127.

The ink chamber 123 is configured to accommodate ink to be supplied to the recording portion 12. The ink inlet portion 121 is disposed on a top portion of the ink chamber 123 and extends upward. The ink inlet portion 121 has an ink inlet port 122 communicating with an inner space of the ink chamber 123 at the top portion to allow the user to pour ink into the ink chamber 123 therethrough.

Figure 4:
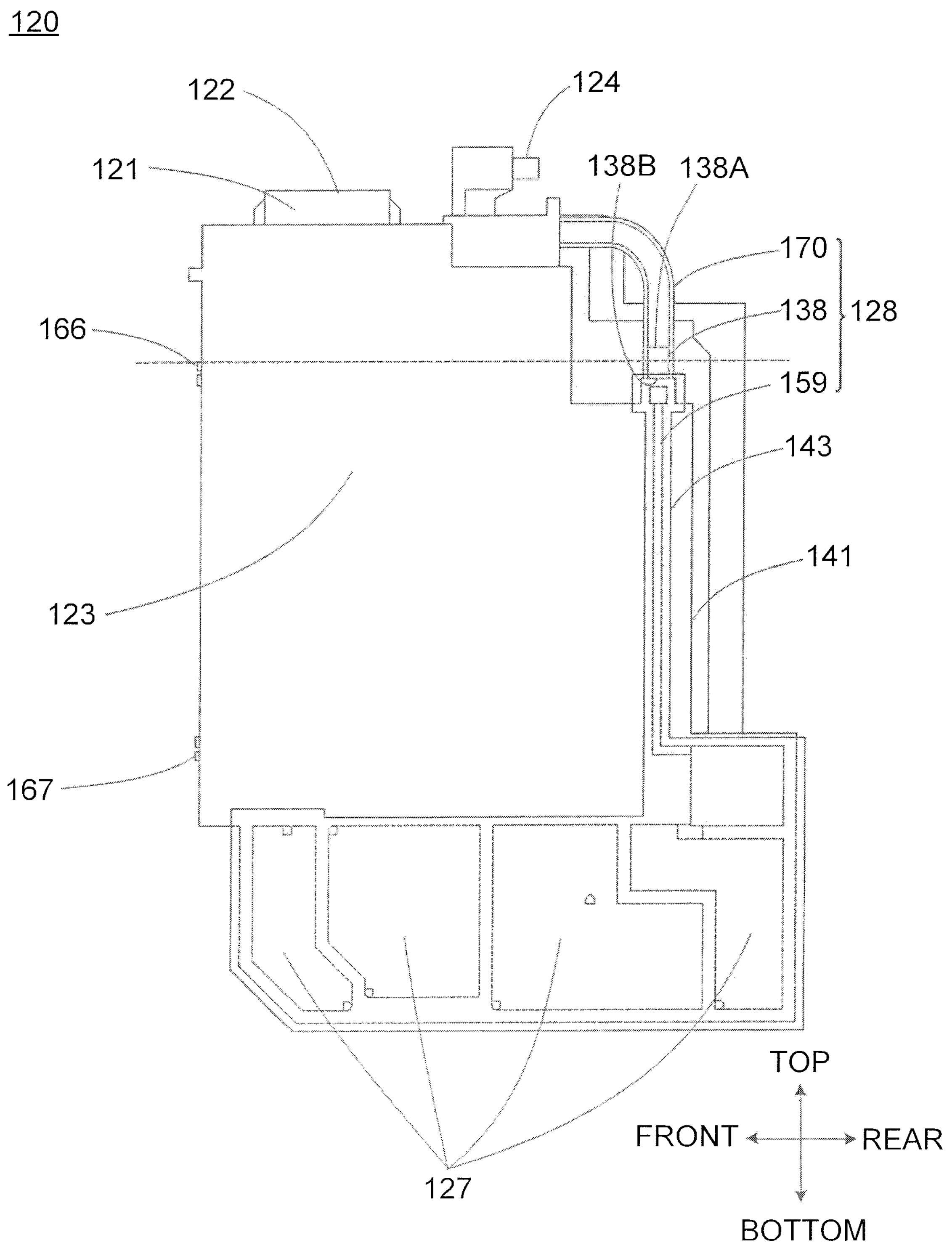
FIG. 4 is a side view of the ink tank shown in FIG. 3.

Preferably, a wall of the ink chamber 123 is made of a light transmissive material. Thereby, the liquid level of the ink contained therein can be observed through the wall of the ink chamber 123. As illustrated in FIGS. 3 and 4, further preferably, an outer surface (e.g., a front side surface) of the ink chamber 123 is also provided with a maximum capacity line 166 and a minimum capacity line 167 for indicating the ink capacity. When the liquid level of the ink in the ink chamber 123 is flush with the minimum capacity line 167, it indicates that the ink in the ink chamber 123 is about to be exhausted, and it is necessary to inlet ink into the ink inlet portion 121. During the ink inletting process, when the liquid level of the ink in the ink chamber 123 is flush with the maximum capacity line 166, it indicates that the ink in the ink chamber 123 has reached the maximum capacity, and it is necessary to stop the ink inletting at this time.

The ink outlet portion 124 is located above the ink chamber 123. In a state where the ink tank 120 is mounted to the inkjet printer 1, the ink outlet portion 124 can communicate with the recording portion 12 through an ink outlet tube (not shown) to supply the ink contained in the ink chamber 123 to the recording portion 12.

The buffer chamber 127 is located below the ink chamber 123 and communicates with the ink chamber 123 through a flow path (not shown). The buffer chamber 127 is also in communication with the outside atmosphere through the air communication portion 128. As described in the TECHNICAL FIELD, the buffer chamber 127 serves to accommodate a small portion of the ink flowing out of the ink chamber 123 during the ink inletting process. In addition, when the ink tank 120 is tilted in a state where ink is contained, the buffer chamber 127 may slow down the speed at which the ink in the ink chamber 123 flows toward the air communication portion 128, thereby preventing the ink in the ink chamber 123 from rapidly leaking from the air communication portion 128. Thus, the user may have time to correct the position of the ink tank 120.

According to the ink tank 120 of the disclosure, the air communication portion 128 is configured to include a flow path 159, a connecting portion 138 and an air communication tube 170. Specifically, the flow path 159 is in fluid communication with the buffer chamber 127, at least a portion of which is disposed on the side wall of the ink chamber 123, and extends over the side wall. As illustrated in FIGS. 3 and 4, in the first embodiment, the flow path 159 is integrally provided on the side wall of the ink chamber 123. By integrally molding the flow path 159 and the side wall of the ink chamber 123, the possibility of damage of the flow path 159 may be reduced. The connecting portion 138 is provided at the top of the flow path 159 and has a passage therein that communicates with the flow path 159. The air communication tube 170 is connected to the connecting portion 138. Thus, the buffer chamber 127 may be in communication with the outside atmosphere through the flow path 159, the connecting portion 138 and the air communication tube 170.

In addition, a top end 138A of the connecting portion 138 is provided to be not lower than the maximum capacity line 166 of the ink chamber 123. As such, even if a portion of the air communication tube 170 above the connecting portion 138 is damaged, the damaged portion is necessarily higher than the maximum capacity line 166 of the ink chamber 123. Therefore, when the air communication tube 170 is damaged and the buffer chamber 127 can communicate with the outside atmosphere through the damaged portion so that the ink chamber 123 forms a communication device with the buffer chamber 127 and the air communication portion 128, the liquid level on both sides of the communication device is necessarily lower than the maximum capacity line 166. Thereby, the liquid level of the ink in the space of the buffer chamber 127 and the air communication portion 128 may be lower than the damaged portion of the air communication tube 170. Therefore, even if the air communication tube 170 is damaged, the ink may not flow out from the damaged portion. As illustrated in FIG. 4, in the first embodiment, the top end 138A of the connecting portion 138 is higher than the maximum capacity line 166 of the ink chamber 123, and the bottom end 138B of the connecting portion 138 is lower than the maximum capacity line 166 of the ink chamber 123.

The ink tank 120 according to the disclosure may be composed of a resin material and a film. Specifically, a resin frame 141 constituting a main body of the ink tank 120 may be formed in the mold by injection molding using a resin material. The resin frame 141 is provided with a plurality of chambers for forming inner spaces of the ink chamber 123 and the buffer chamber 127, and a groove for forming the flow path 159 is provided on the side wall of a chamber forming the ink chamber 123. The chamber and the groove have lateral openings to facilitate separation of the resin frame 141 from the mold. A film 143 is then joined to the resin frame 141 by a joint such as bonding or the like and covers the lateral openings of the chamber and the groove to form the ink chamber 123, the buffer chamber 127, and the flow path 159, respectively.

As illustrated in FIGS. 3 and 4, the chamber forming the buffer chamber 127 and the groove forming the flow path 159 are opened toward the right side on the resin frame 141, and the chamber forming the ink chamber 123 is opened toward the left side on the resin frame 141. Here, the buffer chamber 127 and the flow path 159 share the same film 143 to simplify the structure. Further, although not shown in the drawings, it is understood that a film for forming the ink chamber 123 is also adhered to the left side of the resin frame 141.

Second Embodiment

Figure 5:
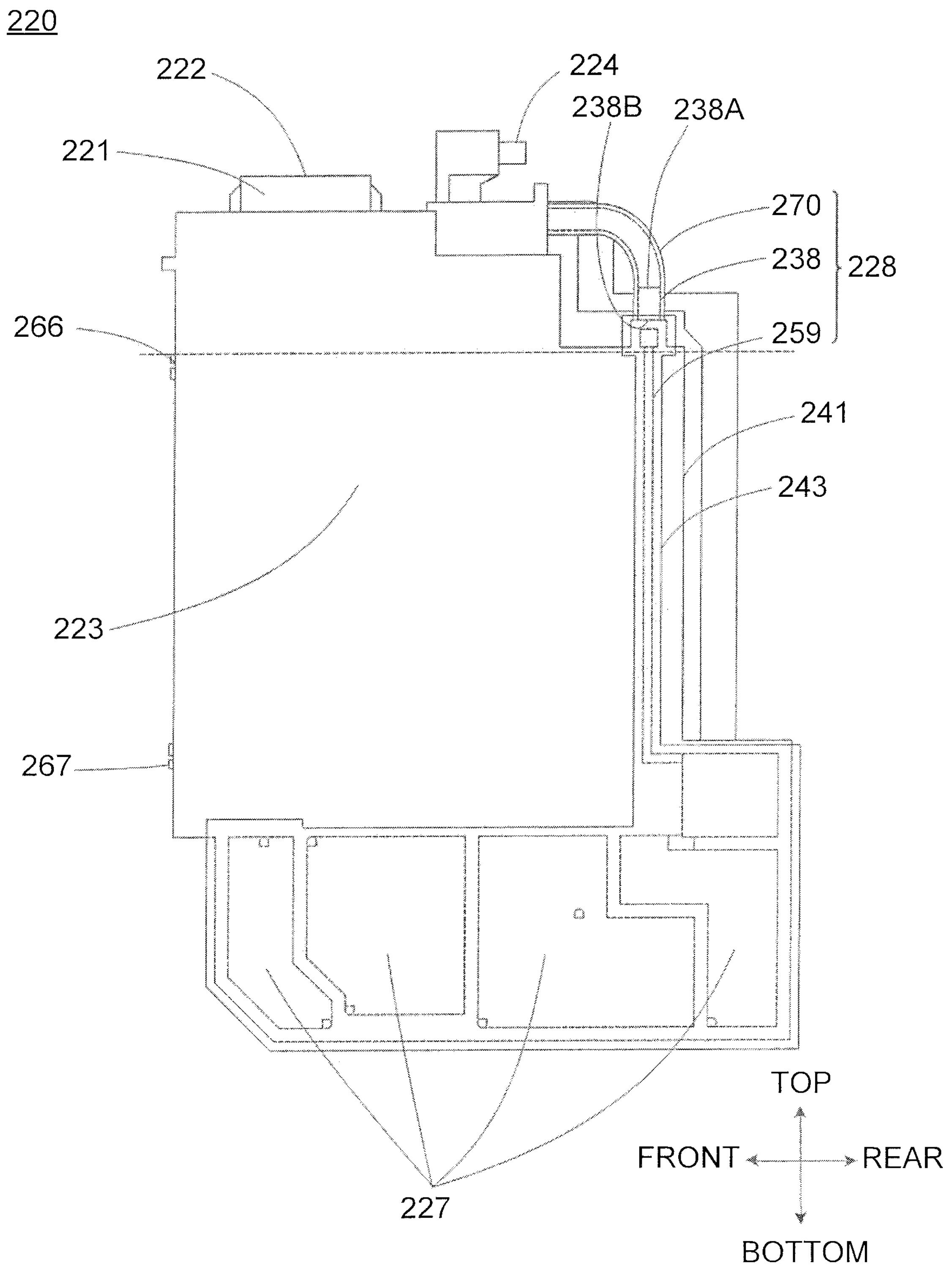
FIG. 5 is a side view of an ink tank according to a second embodiment of the disclosure.

FIG. 5 shows an ink tank 220 according to a second embodiment of the disclosure. The ink tank 220 includes an ink chamber 223, an ink inlet portion 221, an ink outlet portion 224, an air communication portion 228, and a buffer chamber 227. The ink inlet portion 221 has an ink inlet port 222 communicating with an inner space of the ink chamber 223 at the top portion to allow the user to pour ink into the ink chamber 223 therethrough. According to the ink tank 220 of the disclosure, the air communication portion 228 is configured to include a flow path 259, a connecting portion 238 and an air communication tube 270. As illustrated in FIG. 5, further preferably, an outer surface (e.g., a front side surface) of the ink chamber 223 is also provided with a maximum capacity line 266 and a minimum capacity line 267 for indicating the ink capacity. As illustrated in FIG. 5, in the second embodiment, the ink tank 220 is configured such that both of a top 238A of the connecting portion 238 and a bottom end 238B of the connecting portion 238 is higher than the maximum capacity line 266 of the ink chamber 223. The connecting portion 238 and the air communication tube 270 are both higher than the maximum capacity line 266. This may prevent the air communication tube 270 from being damaged to cause the ink to flow out. Further, as illustrated in FIG. 5, the chamber forming the buffer chamber 227 and the groove forming the flow path 259 are opened toward the right side on the resin frame 241, and the chamber forming the ink chamber 223 is opened toward the left side on the resin frame 241 as well as FIGS. 3 and 4. Here, the buffer chamber 227 and the flow path 259 share the same film 243 to simplify the structure. Further, although not shown in the drawings, it is understood that a film for forming the ink chamber 223 is also adhered to the left side of the resin frame 241.

Third Embodiment

Figure 6:
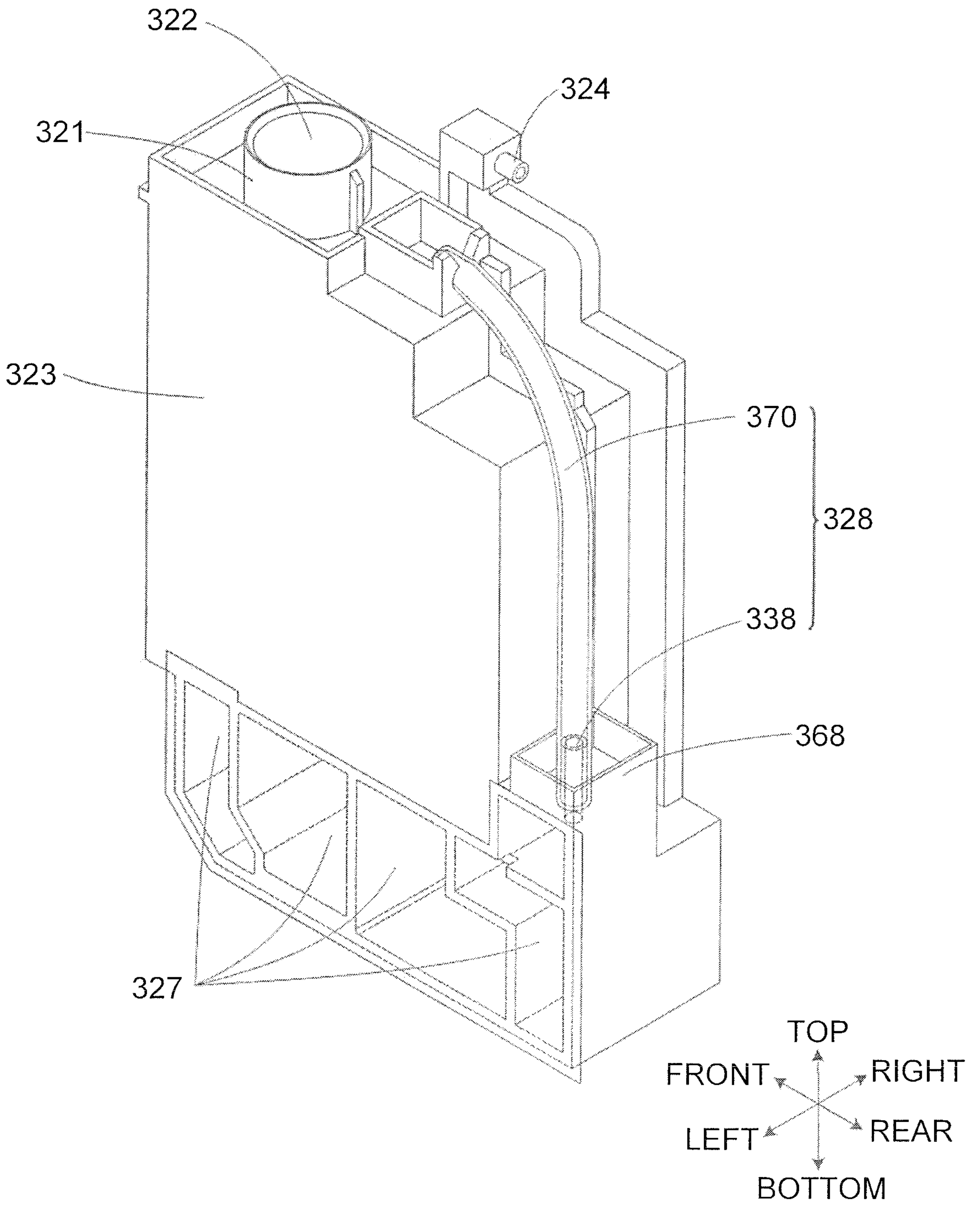
FIG. 6 is a perspective view of an ink tank according to a third embodiment of the disclosure.

FIG. 6 shows an ink tank 320 according to a third embodiment of the disclosure. The ink tank 320 includes an ink chamber 323, an ink inlet portion 321, an ink outlet portion 324, an air communication portion 328, and a buffer chamber 327.

The ink chamber 323 is configured to accommodate ink to be supplied to the recording portion 12. The ink inlet portion 321 is disposed on a top portion of the ink chamber 323 and extends upward. The ink inlet portion 321 has an ink inlet port 322 communicating with an inner space of the ink chamber 323 at the top portion to allow the user to pour ink into the ink chamber 323 therethrough.

Figure 7:
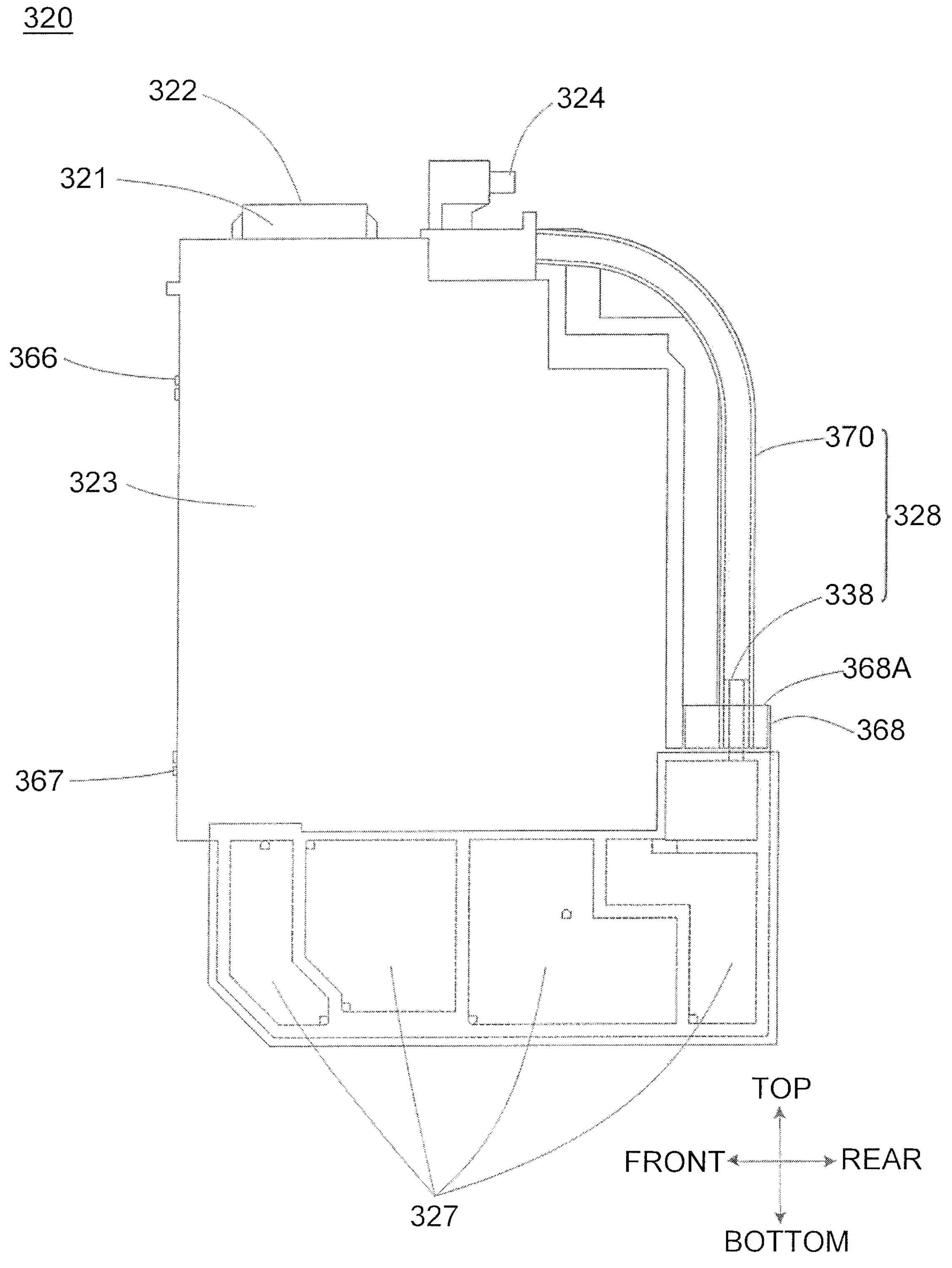
FIG. 7 is a side view of the ink tank shown in FIG. 6.

Preferably, a wall of the ink chamber 323 is made of a light transmissive material. Thereby, the liquid level of the ink contained therein can be observed through the wall of the ink chamber 323. As illustrated in FIG. 7, further preferably, an outer surface (e.g., a front side surface) of the ink chamber 323 is also provided with a maximum capacity line 366 and a minimum capacity line 367 for indicating the ink capacity. When the liquid level of the ink in the ink chamber 323 is flush with the minimum capacity line 367, it indicates that the ink in the ink chamber 323 is about to be exhausted, and it is necessary to inlet ink into the ink inlet portion 321. During the ink inletting process, when the liquid level of the ink in the ink chamber 323 is flush with the maximum capacity line 366, it indicates that the ink in the ink chamber 323 has reached the maximum capacity, and it is necessary to stop the ink inletting at this time.

The ink outlet portion 324 is located above the ink chamber 323. In a state where the ink tank 320 is mounted to the inkjet printer 1, the ink outlet portion 324 can communicate with the recording portion 12 through an ink outlet tube (not shown) to supply the ink contained in the ink chamber 323 to the recording portion 12.

The buffer chamber 327 is located below the ink chamber 323 and communicates with the ink chamber 323 through a flow path (not shown). The air communication portion 328 is configured to include a connecting portion 338 and an air communication tube 370. The connecting portion 338 is provided at the top portion of the buffer chamber 327 and has a passage therein that communicates with the buffer chamber 327. A top portion of the connecting portion 338 is lower than the maximum capacity line 366 of the ink chamber 323. The air communication tube 370 is connected to the connecting portion 338. Thus, the buffer chamber 327 may be in communication with the outside atmosphere through the connecting portion 338 and the air communication tube 370. A continuous fluid passage may be formed along the ink inlet portion 321, the ink chamber 323, the buffer chamber 327, and the air communication portion 328 in this order.

As described in the TECHNICAL FIELD, the buffer chamber 327 serves to accommodate a small portion of the ink flowing out of the ink chamber 323 during the ink inletting process. In addition, when the ink tank 320 is tilted in a state where ink is contained, the buffer chamber 327 may slow down the speed at which the ink in the ink chamber 323 flows toward the air communication portion 328, thereby preventing the ink in the ink chamber 323 from rapidly leaking from the air communication portion 328. Thus, the user may have time to correct the position of the ink tank 320.

Figure 1:
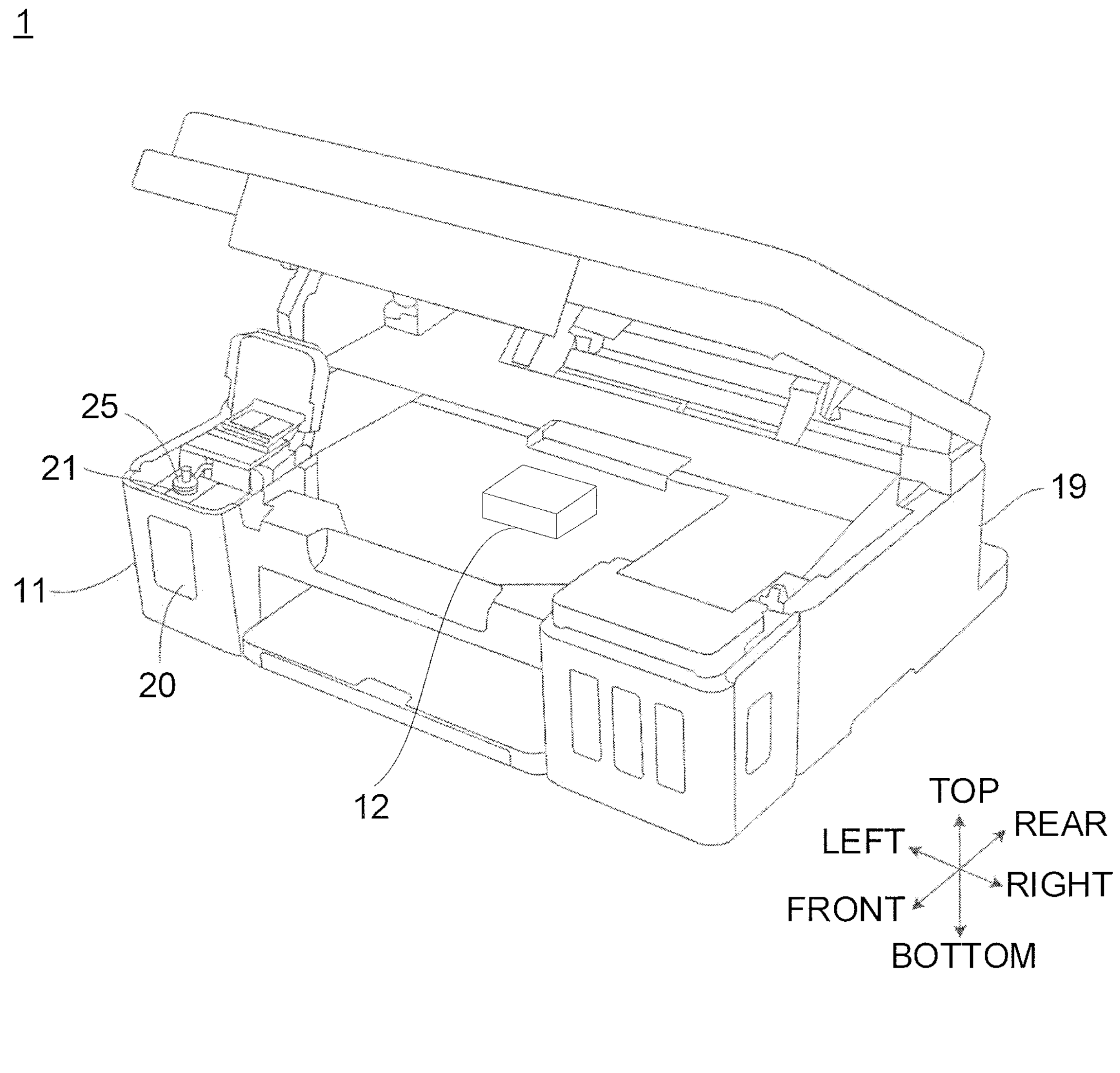
FIG. 1 is a perspective view of a conventional inkjet printer.

If a portion, between the switching member and the connecting portion 338, of the air communication tube 370 is damaged to cause the buffer chamber 327 to be in communication with the outside atmosphere through the damaged portion, during the ink inletting process or when the cap 25 shown in FIG. 1 cannot seal the ink inlet port 322, an inner space of the ink tank 320 may form a structure of a communication device. The ink stored in the ink chamber 323 may flow into the buffer chamber 327 through the flow path between the ink chamber 323 and the buffer chamber 327, and may flow into the air communication portion 328 after the buffer chamber 327 is filled. If the lowest point of the damaged portion of the air communication tube 370 is lower than the ink level in the ink chamber 323 in a state where the buffer chamber 327 is filled with ink, the ink may continue to leak from the damaged portion until the ink level in the ink chamber 323 is flush with the damaged portion of the air communication tube 370. If the user continuously inlets ink without paying attention to the damage during the ink inletting process, the ink may continue to leak from the damaged portion.

According to the ink tank 320 of the disclosure, a barrier wall 368 protruding upward and surrounding the connecting portion 338 is provided at the top of the buffer chamber 327. Thus, an area surrounded by the barrier wall 368 may temporarily store the ink leaking from the damaged portion of the air communication tube 370, preventing the ink from flowing along the outer surface of the ink tank 320 to cause contamination.

In addition, as illustrated in FIG. 7, the height of the air communication tube 370 with respect to the connecting portion 338 gradually increases along an extending direction of the air communication tube 370 from the one end connected to the connecting portion 338 to the other end. When the air communication tube 370 is damaged to cause the ink to leak from the damaged portion, the leaked ink may flow down along the outer surface of the air communication tube 370. Even if the damaged portion of the air communication tube 370 is higher than an upper edge 368A of the barrier wall 368, or the projection of the damaged portion of the air communication tube 370 on a horizontal surface is outside the projection of the area surrounded by the barrier wall 368, the leaked ink may flow along the air communication tube 370 to the connecting portion 338, thereby flowing into the area surrounded by the barrier wall 368. Thus, the leaked ink may be easily collected.

Fourth Embodiment

Figure 8:
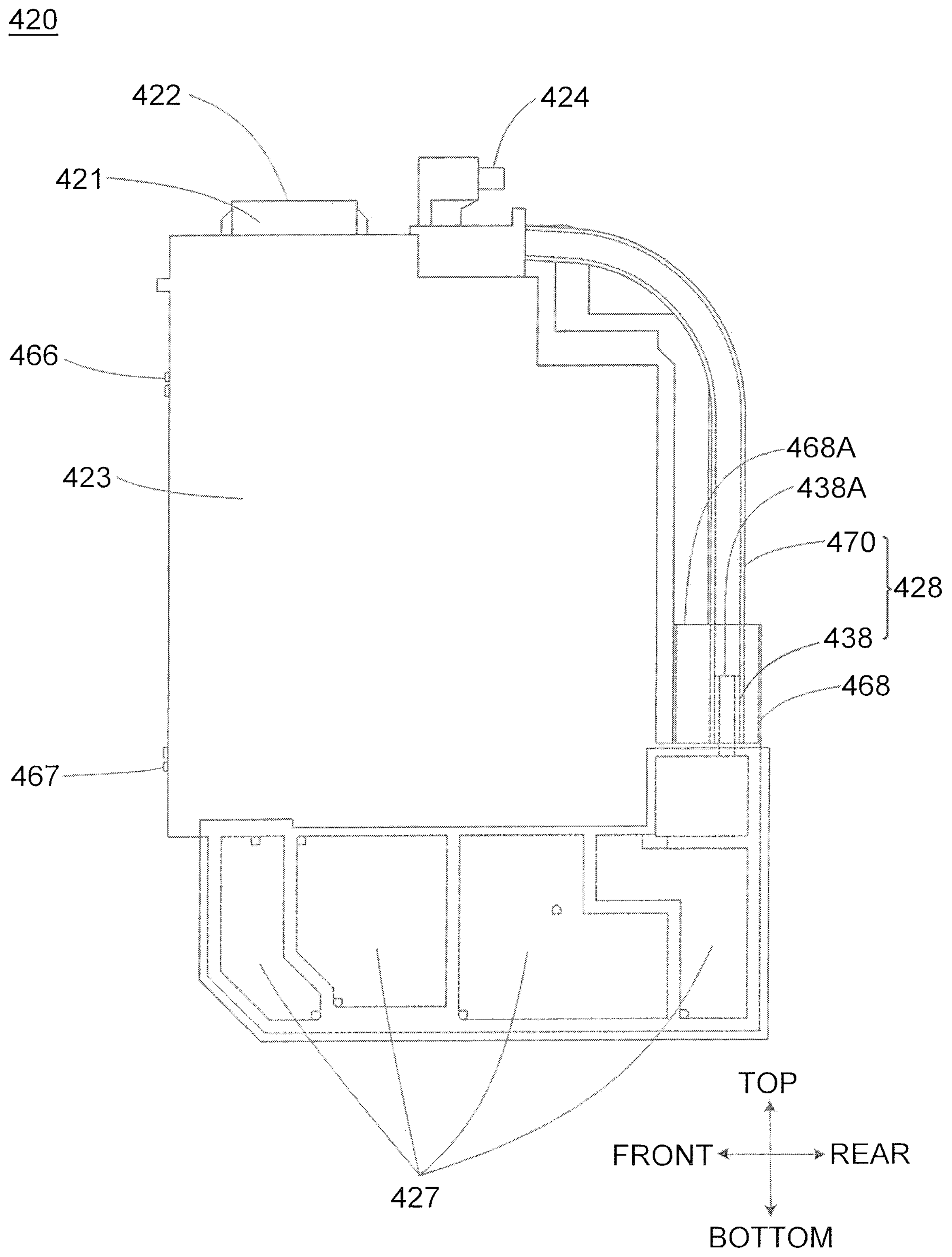
FIG. 8 is a side view of an ink tank according to a fourth embodiment of the disclosure.

FIG. 8 shows an ink tank 420 according to a fourth embodiment of the disclosure. Here, a barrier wall 468 is configured such that an upper edge 468A of the barrier wall 468 is not lower than a top end 438A of a connecting portion 438 of an air communication portion 428. In the fourth embodiment, the upper edge 468A of the barrier wall 468 is higher than the top end 438A of the connecting portion 438. Because an air communication tube 470 is most likely to be damaged at a position connected to the connecting portion 438, the ink tank 420 according to the fourth embodiment may cope with the leakage caused by the damage at the position.

Fifth Embodiment

Figure 9:
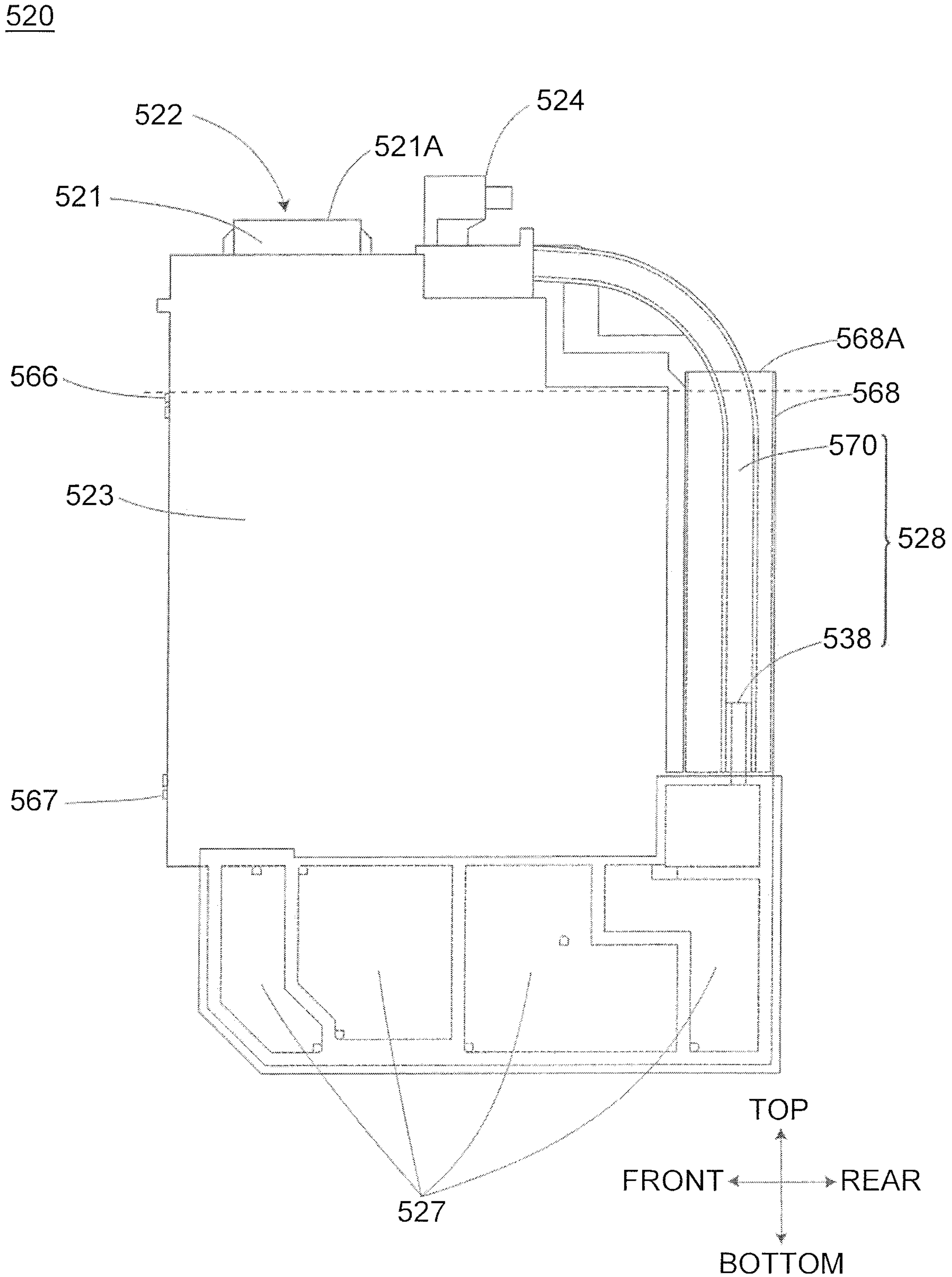
FIG. 9 is a side view of an ink tank according to a fifth embodiment of the disclosure.

FIG. 9 shows an ink tank 520 according to a fifth embodiment of the disclosure. Here, a barrier wall 568 is configured such that an upper edge 568A of the barrier wall 568 is not lower than a maximum capacity line 566 of an ink chamber 523. In the fifth embodiment, the upper edge 568A of the barrier wall 568 is higher than the maximum capacity line 566.

Theoretically, in a non-inletting state, the ink level in the normal ink chamber 523 when the maximum amount of ink is stored is flush with the maximum capacity line 566. If an air communication tube 570 is damaged to cause an inner space of the ink tank 520 to form a structure of a communication device, then when the ink level is stable, the ink level in the ink chamber 523, the ink level in the air communication tube 570 and the liquid level of the leaked ink stored in the area surrounded by the barrier wall 568 are flush with each other, and is necessarily lower than the maximum capacity line 566, that is, the leaked ink may not overflow from the barrier wall 568.

On the other hand, if the user does not find that the air communication tube 570 is damaged to cause the inner space of the ink tank 520 to form the structure of the communication device during the ink inletting and continues to inlet ink, then when the ink inletting is stopped, the ink chamber 523, the air communication tube 570 and the area surrounded by the barrier wall 568 may have a flush ink level. Generally, when the ink level in the ink chamber 523 is flush with the maximum capacity line 566, the ink inletting is stopped and accordingly the highest ink level in the area surrounded by the barrier wall 568 is equal to the maximum capacity line 566. Thus, the leaked ink may not overflow from the barrier wall 568.

In addition, if the user continues to inlet ink after the ink level in the ink chamber 523 reaches the maximum capacity line 566, the ink level in the ink chamber 523 may be flush with an ink inlet port 522 at a top portion of an ink inlet portion 521, and further ink inletting may cause ink to overflow from the ink inlet port 522. Therefore, the upper edge 568A of the barrier wall 568 may be flush with a top end 521A of the ink inlet portion 521 up to the highest. Typically, after the level of ink in the ink chamber 523 reaches the maximum capacity line 566, the ink will not continue to be inleted. Thus, the upper edge 568A of the barrier wall 568 is generally disposed lower than the top end 521A of the ink inlet portion 521 so as to maintain the ink tank 520 in a compact structure.

Figure 2:
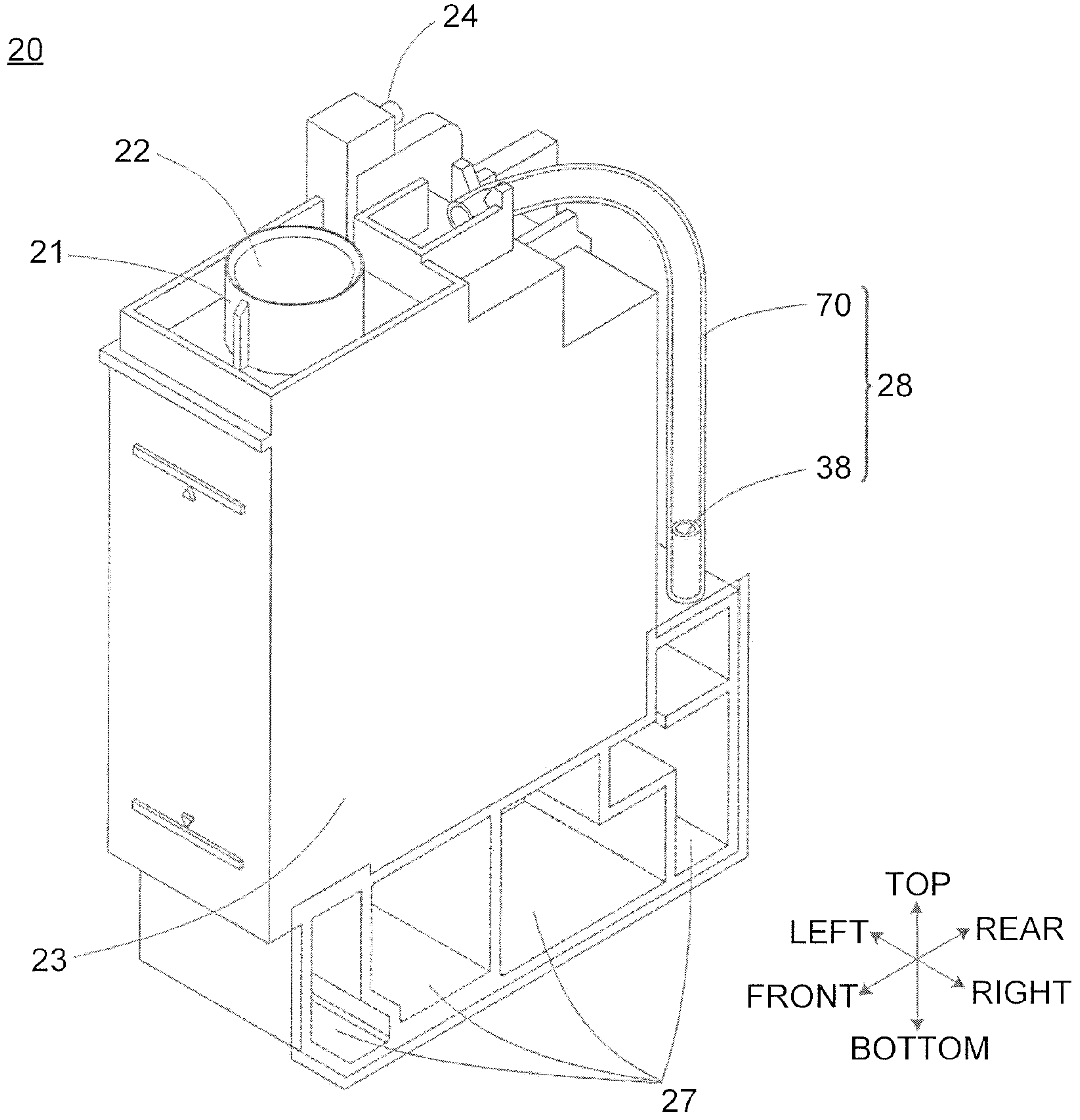
FIG. 2 is a perspective view of an ink tank used in the inkjet printer shown in FIG. 1.

The ink tank according to the disclosure works in the same manner as the ink tank 20 shown in FIG. 2, and may be specifically referred to the related description in the TECHNICAL FIELD. For the sake of brevity, it will not be described in detail here.

According to the ink tank of the disclosure, the connecting portion communicates with the buffer chamber through the flow path provided on the side wall of the ink chamber, the structure of the flow path is not easily damaged, and the top end of the connecting portion is not lower than the maximum capacity line. Thus, even if the air communication tube is damaged, it is ensured that the damaged portion is higher than the highest liquid level of the ink in the ink chamber, thereby preventing the ink from undesirably flowing out.

Further, the ink tank according to the disclosure is provided with the barrier wall surrounding the connecting portion. Thus, when the air communication portion is damaged to cause ink leakage, the area surrounded by the barrier wall may temporarily store the leaked ink to avoid contamination.

According to another aspect of the disclosure, an inkjet printer is also provided. The inkjet printer according to the disclosure may be configured to include a printer body and any of the above-described ink tanks.

The inkjet printer preferably includes four ink containers, which are disposed on one side (for example, a front side) of the printer body. One of the four ink tanks is disposed at the front left side of the printer body and is usually used to contain black ink. The remaining three ink tanks are disposed at the front right side of the printer body and are used to contain three color inks of cyan, magenta and yellow, from left to right. Thus, the inkjet printer may record color images using the four color inks of black, cyan, magenta and yellow. Other numbers of ink tanks may be provided according to actual needs, and the ink tank may also be disposed at other positions of the printer body. Further, the ink tank may be fixedly mounted to the printer body according to actual needs, or may be configured to be detachably mounted to the printer body.

While the disclosure has been described in detail with reference to the specific embodiments thereof, these are merely examples, and various changes, arrangements and modifications may be applied therein without departing from the spirit and scope of the disclosure.

What is claimed is:

1. An ink tank for an inkjet printer including a printer body and a cover that can be opened and closed with respect to the printer body, the ink tank being located in the printer body and not changing its posture with respect to the printer body, the ink tank comprising:

an ink chamber configured to contain ink to be supplied to the printer body, the ink chamber having an opening at a bottom portion thereof, the ink chamber including a first outer surface provided with a minimum capacity line indicating an ink capacity level relative to a first direction, a second outer surface spaced away from the first outer surface and facing in the first direction, and a side wall including a third outer surface connected to and extending from each of the first outer surface and the second outer surface;

an ink inlet port configured to be exposed when the cover is opened with respect to the printer body, wherein the ink inlet port always faces upward;

a cap sealing the ink inlet port;

a plurality of buffer chambers communicating with the ink chamber and positionally disposed at a level in the device that is located below the bottom portion of the ink chamber; and an air communication portion comprising a flow path communicating with the plurality of buffer chambers, at least a portion of the flow path being a groove in the side wall of the ink chamber, the groove being formed in the side wall, recessed inwardly from the third outer surface and extending upward in the first direction along the side wall of the ink chamber and away from the plurality of buffer chambers, the flow path including a top portion being connected to the groove and protruding upward in the first direction from the second outer surface of the ink chamber, a connecting portion disposed at the top portion of the flow path, wherein air passes through the connecting portion, and an air communication tube including a first end connected to the connecting portion and a second end having an air communication hole through which air passes and being in fluid communication with the flow path through the connecting portion, the air communication tube being separable from the connecting portion, and the air communication tube being configured to be opened when the ink is supplied from the ink chamber to the printer body and to be closed to prevent large amounts of ink from flowing into the plurality of buffer chambers through the opening in the bottom of the ink chamber when the ink flows into the ink chamber from the ink inlet port, wherein the air communication hole and the opening at the bottom of the ink chamber communicate via the air communication tube, the connecting portion, the flow path and the plurality of buffer chambers, wherein the ink tank located in the printer body has no change in posture when ink inlets into the ink chamber and when ink is supplied from the ink chamber to the printer body, wherein a portion of the plurality of buffer chambers is always below the minimum capacity line in a direction of gravity, and wherein a film covers the groove to form a portion of the flow path of the air communication portion, the film forms at least a portion of a side surface of the plurality of buffer chambers, and the film contacts a portion of the third outer surface.

2. The ink tank according to claim 1, wherein a top end of the connecting portion is equal to or higher than a maximum capacity line of the ink chamber.

3. The ink tank according to claim 2, wherein a bottom end of the connecting portion is higher than the maximum capacity line of the ink chamber.

4. The ink tank according to claim 1, further comprising:

an ink inlet portion, the ink inlet portion being disposed on a top portion of the ink tank and having the ink inlet port communicating with the inner space of the ink chamber to inlet ink, and the ink inlet portion protruding upward in the first direction away from the top portion of the ink tank.

5. An inkjet printer comprising:

an ink tank according to claim 1; and a recording portion configured to record an image on a sheet with the ink supplied from the ink tank.

6. An inkjet printer comprising:

an ink tank according to claim 2; and a recording portion configured to record an image on a sheet with the ink supplied from the ink tank.

7. An inkjet printer comprising:

an ink tank according to claim 3; and a recording portion configured to record an image on a sheet with the ink supplied from the ink tank.

8. An inkjet printer comprising:

an ink tank according to claim 4; and a recording portion configured to record an image on a sheet with the ink supplied from the ink tank.

9. The ink tank according to claim 1, wherein the connecting portion is a hollow cylinder that protrudes in the first direction from the top portion of the air flow path, and the hollow cylinder extends into the air communication tube.

10. The ink tank according to claim 1, wherein the air communication hole in the second end of the air communication tube faces in a second direction that intersects the first direction.

11. The ink tank according to claim 1, wherein both of the first end and the second end of the air communication tube are spaced upward in the first direction from the second outer surface of the ink chamber.

12. The ink tank according to claim 11, wherein the second end of the air communication tube is spaced away from the first end of the air communication tube in both the first direction and a second direction that intersects the first direction.

13. The ink tank according to claim 1, wherein the connecting portion protrudes upward in the first direction from the top end of the flow path.

14. The ink tank according to claim 1, wherein the air communication tube extends away from the connecting portion in the first direction and toward the ink port in a second direction that intersects the first direction.

* * * * *